United States Patent
Gao et al.

(10) Patent No.: US 8,639,720 B2
(45) Date of Patent: Jan. 28, 2014

(54) DATA ACCESS METHOD AND CONFIGURATION MANAGEMENT DATABASE SYSTEM

(75) Inventors: Peng Gao, Beijing (CN); Shaw-Ben Shi, Austin, TX (US); Zhen Yang, Beijing (CN); Yue Yu, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 561 days.

(21) Appl. No.: 12/970,485

(22) Filed: Dec. 16, 2010

(65) Prior Publication Data

US 2011/0191375 A1 Aug. 4, 2011

(30) Foreign Application Priority Data

Jan. 29, 2010 (CN) .......................... 2010 1 0105049

(51) Int. Cl.
*G06F 17/30* (2006.01)
*G06F 7/00* (2006.01)

(52) U.S. Cl.
USPC ........................ 707/781; 707/782; 709/217

(58) Field of Classification Search
USPC ................................ 707/781, 782; 709/217
See application file for complete search history.

(56) References Cited

U.S. PATENT DOCUMENTS

| | | | |
|---|---|---|---|
| 2004/0015504 A1 | 1/2004 | Ahad et al. | |
| 2007/0143365 A1 | 6/2007 | D'Souza et al. | |
| 2008/0194273 A1* | 8/2008 | Kansal et al. | 455/456.3 |

FOREIGN PATENT DOCUMENTS

| | | |
|---|---|---|
| CN | 1659548 A | 8/2005 |
| CN | 101118509 A | 2/2008 |
| CN | 101218563 | 7/2008 |

* cited by examiner

*Primary Examiner* — Vincent F Boccio
(74) *Attorney, Agent, or Firm* — Law Office of Jim Boice (57) ABSTRACT

A computer implemented method for accessing data begins with receipt of a data access request. In response to determining that the requested data needs to be acquired in real time from an original data source, the processor acquires and stores that data. In response to determining that the data cannot be acquired in real time from the data source, the processor acquires the data from a configuration management database in which the requested data was previously stored.

14 Claims, 10 Drawing Sheets

FIG. 1
(PRIOR ART)

| FULLY QUALIFIED NAME | IP ADDRESS | MACHINE TYPE | CURRENT VALUE |
|---|---|---|---|
| tivoliad.cn.ccc.com | 9.123.122.232 | 9287-L6VLHRF | N/A |
| beijing-cdl.cn.ccc.com | 9.123.121.101 | 7896-LJFLIGH | N/A |
| tivitest01.cn.aaa.com | 9.123.122.99 | 2689-L3VHLJJ | 20,987 |
| beijingZ1.cn.aaa.com | 9.123.121.26 | 2349-LLFJLEH | N/A |
| beijingZ2.cn.aaa.com | 9.123.121.188 | 2349-LLFJKGH | 51,777 |

| FULLY QUALIFIED NAME | IP ADDRESS | MACHINE TYPE | CURRENT VALUE |
|---|---|---|---|
| tivoliad.cn.ccc.com | 9.123.122.232 | 9287-L6VLHRF | ☑ 8,995 |
| beijing-cdl.cn.ccc.com | 9.123.121.101 | 7896-LJFLIGH | △ 10,365 |
| tivitest01.cn.aaa.com | 9.123.122.99 | 2689-L3VHLJJ | △ 20,987 |
| beijingZ1.cn.aaa.com | 9.123.121.26 | 2349-LLFJLEH | ⊗ 48,990 |
| beijingZ2.cn.aaa.com | 9.123.121.188 | 2349-LLFJKGH | △ 51,777 |

☑ CONFIDENCE LEVEL > 90%  △ CONFIDENCE LEVEL 80-90%  ⊗ CONFIDENCE LEVEL < 80%  △ REAL-TIME DATA

FIG. 8

# DATA ACCESS METHOD AND CONFIGURATION MANAGEMENT DATABASE SYSTEM

CROSS-REFERENCE TO RELATED APPLICATION

The present application claims a priority filing date of Jan. 29, 2010 from Chinese Patent Application No. 201010105049.5, which is incorporated herein in its entirety by reference.

BACKGROUND

The present invention relates to a data access method and a configuration management database system.

Configuration management in IT, as documented in an ITIL (IT Infrastructure Library), focuses on managing and maintaining information about the configuration of the IT infrastructure. Such information is stored in a Configuration Management Database (CMDB), which is a critical integration point around which IT processes integrate. The goal of the CMDB is to have a single logic repository which accounts for all the IT asset configuration within the organization and the services, and the CMDB provides accurate information on configurations and documentations to support all the other service management processes.

The existing CMDB have two data access modes: i.e., data consolidation mode and data federation mode, which are used for different types of data.

The data consolidation mode acquires data from a data source according to a predetermined updating period and stores it in the Configuration Management Database, and when receiving a data access request from a client, provides the stored data to the client without accessing the data source to acquire the data in real time. Therefore, the data consolidation mode is mainly for those data that do not change frequently, e.g., machine serial numbers or configuration information. However, the major drawback of the data consolidation mode is data latency. Between the updating periods of the consolidation process, the more frequently the data in the data source changes, the older the data in the CMDB becomes. Therefore, the data acquired by the user from the CMDB may be inconsistent with the current data in the data source.

On the other hand, the data federation mode provides a middleware for applications to access data from different data sources as if they were a single data source, regardless of the location, format, and access language of the data. Different from the data consolidation mode, the data federation mode does not physically store the data acquired from the data source into the CMDB, but accesses different data sources in real time in response to the data access request, and then provides the acquired data to the client. Therefore, the data federation mode is mostly used for real-time data, with advantages of rapid speed and low cost. However, the major drawback of the data federation mode is data availability, that is, if the data source is unavailable, e.g., the data source has faults or is powered off, or a connection between the CMDB and the data source is interrupted, the user cannot obtain the data.

Figure 1:
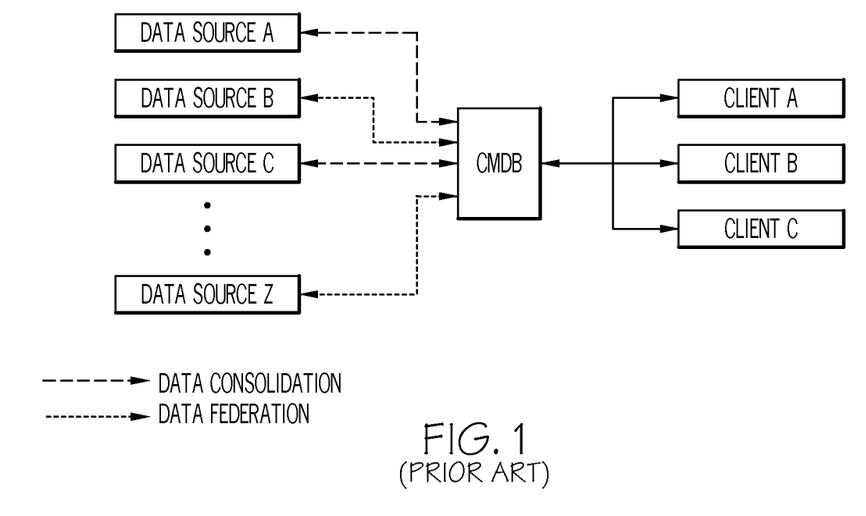
FIG. 1 is a system block diagram showing a configuration management database in the prior art.

FIG. 1 is a system block diagram showing a Configuration Management Database in the prior art. As shown in FIG. 1, the CMDB is connected to data sources A-Z and clients A-C via network or other connecting manner. For example, the CMDB receives a data access request from client A and determines that the data consolidation mode should be used, according to the type of data requested by the data access request. The CMDB provides to client A the data stored in the CMDB that was previously acquired by accessing data sources A and C through the data consolidation mode. However, depending on the updating period of the data consolidation mode, the data provided to the client A may be data that was last updated several days, several weeks, or even several months ago, and thus may be inconsistent with current data in data sources A and C. However, the user cannot judge whether the data is accurate, and may therefore make an inappropriate decision based on the acquired data.

Figure 2A:
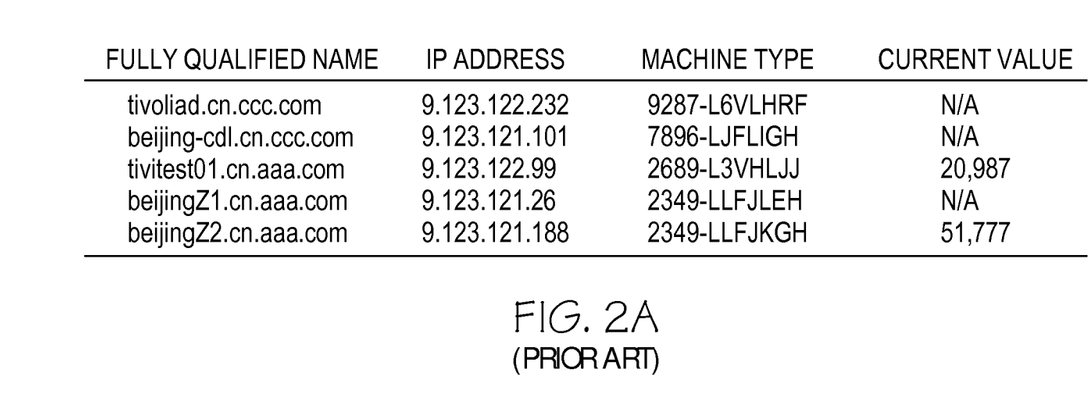
FIGS. 2A and 2B show examples of data integration view that are presented to the user in the prior art.
Figure 2B:
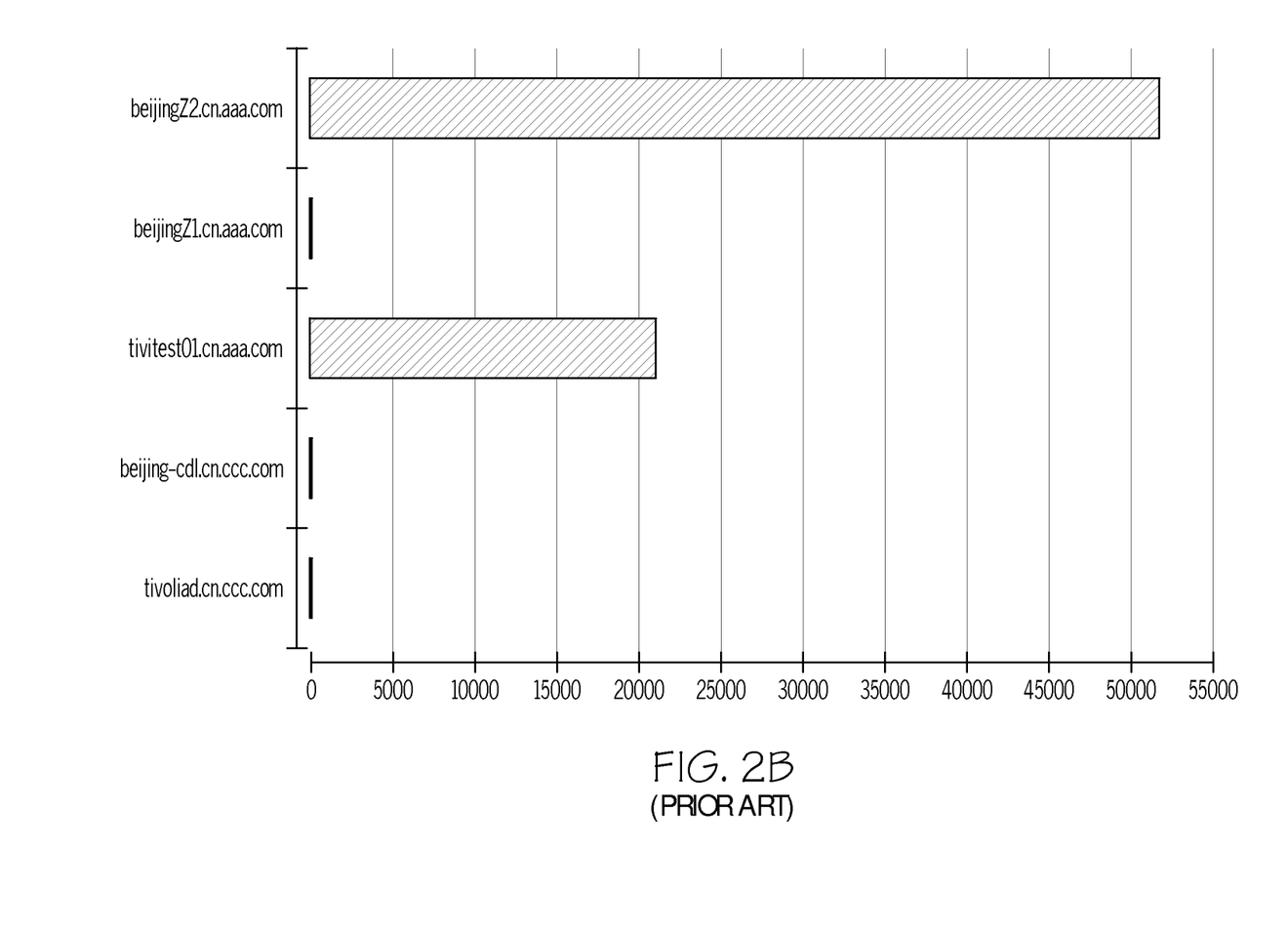

In another example, the CMDB receives a data access request from client C and determines that the data federation mode should be used, according to the type of the data requested by the data access request. The CMDB accesses data sources B and Z in real time and provides the acquired data to the client. However, assume in this example that data cannot be acquired from data source B or Z possibly due to interruption of the connection. FIG. 2A and FIG. 2B show examples of data integration view that are presented to the user in this case, wherein FIG. 2A shows a list and FIG. 2B shows a histogram. The example in FIGS. 2A-2B shows an asset report of current asset values acquired from five different computers. FIG. 2A shows fully qualified names, IP addresses, machine types, current asset values of respective computers. In FIG. 2B, a horizontal coordinate represents current asset values, whereas a longitudinal coordinate represents fully qualified names of the computers. It can be seen from FIG. 2A and FIG. 2B that there are three computers that have a current value of "N/A" or "zero", which means the data cannot be acquired from these computers in real time because these computers are faulty, are powered off, or the connection to the CMDB has been interrupted. Therefore, the user cannot obtain the desired data.

BRIEF SUMMARY

In one embodiment of the present disclosure, a computer implemented method for accessing data beginning with the receipt of a data access request is presented. In response to determining that the requested data needs to be acquired in real time from an original data source, the processor acquires and stores that data. In response to determining that the data cannot be acquired in real time from the data source, the processor acquires the data from a configuration management database in which the requested data was previously stored.

In one embodiment of the present disclosure, a configuration management database system comprises: a database for storing configuration management data; and an access control device for controlling data access operations of the configuration management database system, wherein the access control device comprises: a communication interface for receiving a data access request; and a processor. In response to determining that the requested data needs to be acquired in real time from an original data source, the processor acquires and stores that data. In response to determining that the data cannot be acquired in real time from the data source, the processor acquires the data from a configuration management database in which it was previously stored.

In one embodiment of the present disclosure, a computer program product for accessing data comprises: a computer readable storage media; first program instructions to receive a data access request; second program instructions to, in response to determining that requested data must be acquired in real time by accessing a data source that created the data, acquire the data from the data source in real time and store the acquired data; third program instructions to, in response to determining that the data cannot be acquired in real time from the data source, acquire the data that was previously stored in a configuration management database; and fourth program instructions to provide the acquired data; and wherein the first, second, third, and fourth program instructions are stored on the computer readable storage media.

DETAILED DESCRIPTION

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including, but not limited to, wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 3:
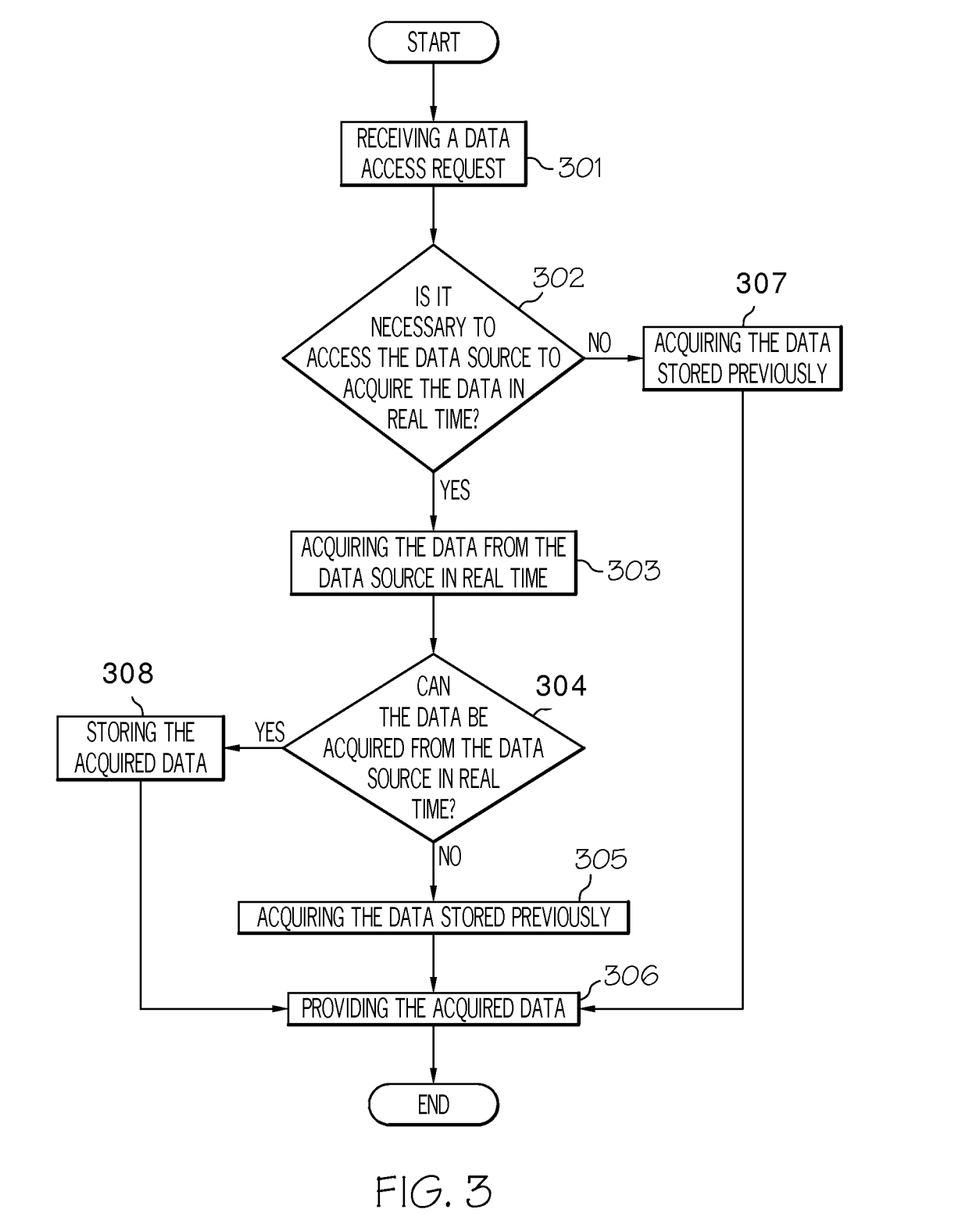
FIG. 3 is a flow chart showing a data access method for a configuration management database according to an aspect of the invention.

FIG. 3 is a flow chart showing a data access method for a configuration management database according to an aspect of the invention. As shown in FIG. 3, in step 301, a data access request is received. For example, the data access request may request current asset values of the respective computers and machine serial numbers of the respective computers. In step 302, it is determined whether it is necessary to access the data source to acquire the data in real time. Here, the determination may be made according to the type of the data requested by the data access request. For example, it is determined according to the requested asset current value that it is necessary to access the data source to acquire the asset current values of the respective computers in real time, and it is determined according to the requested machine serial number that it is not necessary to access the data source to acquire the data in real time. Alternatively, it can also be designated in the data access request whether it is necessary to access the data source to acquire the data in real time.

If it is determined in step 302 that it is necessary to access the data source to acquire the data in real time, the process proceeds to step 303 where data is acquired from the data source in real time. Next, it is determined in step 304 if the data can be acquired from the data source in real time. If it is determined in step 304 that data can be acquired from the data source in real time, the acquired data is stored in step 308. Moreover, the time at which the data is acquired is also stored while storing the data. Here, the acquired data is stored temporarily, and the user may designate how long the data is to be stored according to data amount or the quantity of remaining resources in the configuration management database available for storing the data. If the data amount is large, the storing period may not be long; if there are few remaining resources in the configuration management database available for storing the data, it may be determined that not much more data can be stored. In summary, the data amount shall be guaranteed within an acceptable range of the system. In this way, data acquired each time the data access request is received will be stored within the time period designated by the user.

On the other hand, if it is determined in step 302 that it is not necessary to access the data source to acquire the data in real time, the process proceeds to step 307. In step 307, the data stored previously is acquired, i.e. the data that was gathered from the data source and stored in the configuration management database by the data consolidation method in the prior art, preferably, the data that was acquired at a most recent time. Moreover, the time at which the data was acquired is also stored while storing the data.

Returning to step 304, if it is determined that the data cannot be acquired in real time from the data source, the data stored previously (preferably, the most recent data) is acquired, as depicted in step 305. Finally, in step 306, the acquired data is provided. Here, the acquired data may be the data that was acquired in real time from step 308, or the data that was stored previously from steps 305 and 307.

The data access method for a configuration management database shown in FIG. 3 can provide the user with data that was stored previously as decision reference even if the data source is currently unavailable, by storing the data that was acquired when the data source was available, thereby overcoming the drawback of the existing data federation method.

Figure 4:
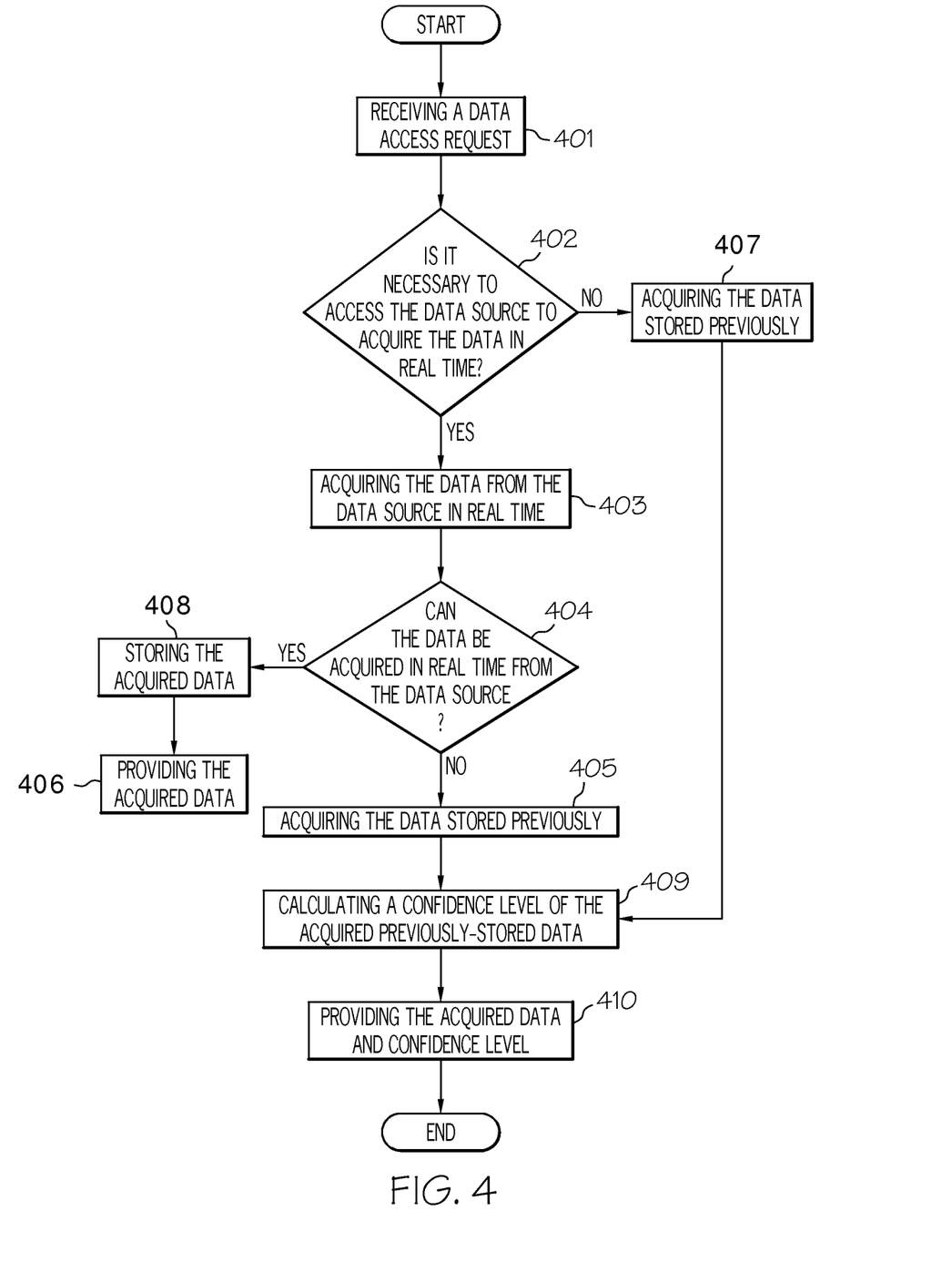
FIG. 4 is a flow chart showing a data access method for a configuration management database according to another aspect of the invention.

FIG. 4 is a flow chart showing a data access method for a configuration management database according to another aspect of the invention. The steps 401-408 in FIG. 4 are similar to the steps 301-308 in FIG. 3 and thus are omitted here, and only steps 409 and 410 that are added to FIG. 4 are described.

Figure 5:
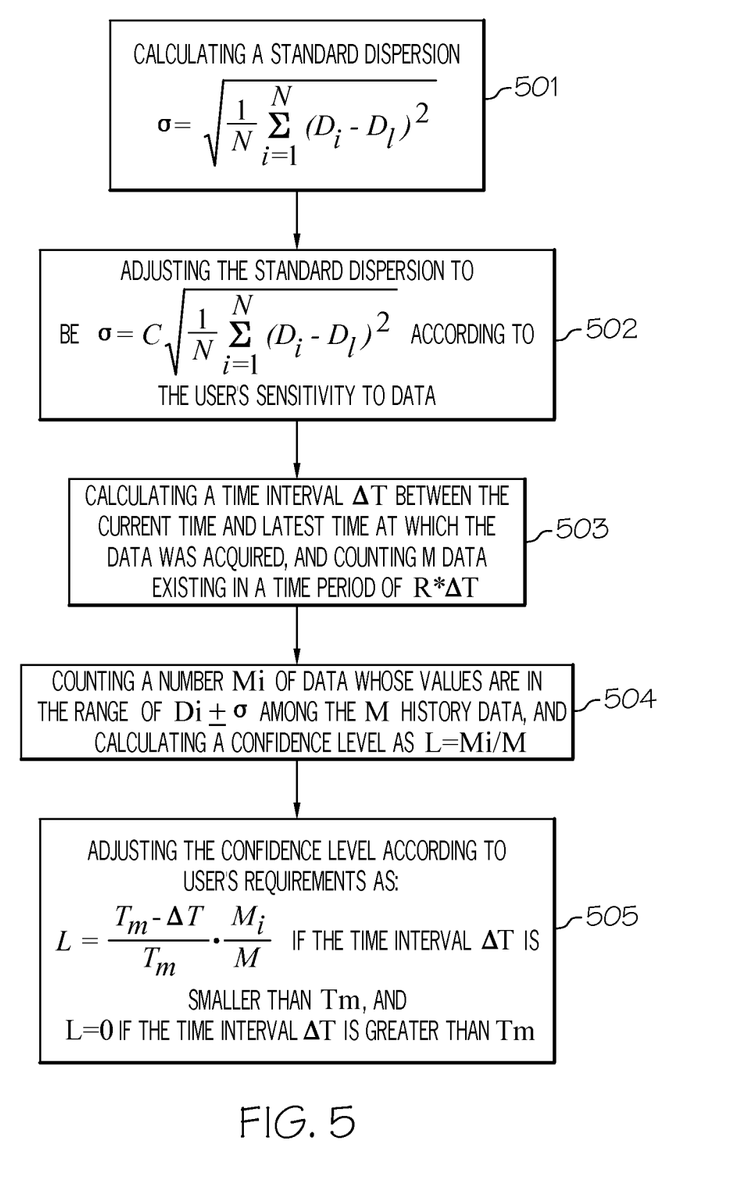
FIG. 5 is a flow chart showing a method of calculating a confidence level according to the invention.

In step 409, a confidence level of the previously-stored data acquired from the steps 407 and 405 is calculated. In step 409, the data from steps 407 and 405 that was stored previously is considered, rather than data that is acquired in real time. The confidence level is calculated according to the history record of the previously stored data. A specific method for calculating the confidence level is shown in FIG. 5 below. In step 410, the confidence level is also provided while providing the data, such that the reliability of the acquired data is provided to the user along with the acquired data to help the user in making decisions.

Figure 6:
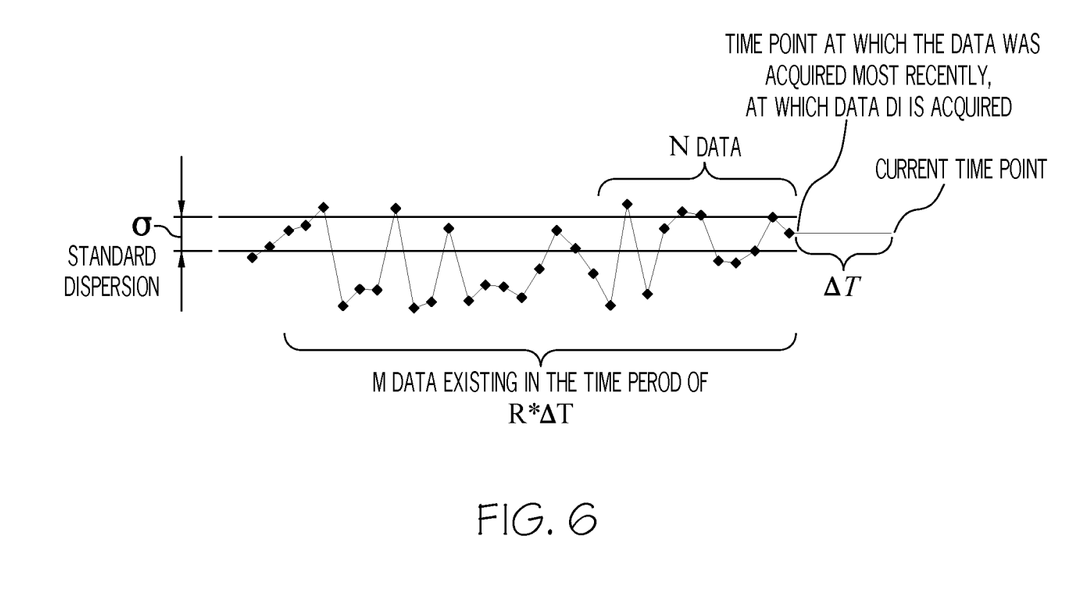
FIG. 6 illustratively shows various parameters used in the method of FIG. 5.

FIG. 5 is a flow chart showing a method for calculating the confidence level according to the invention. FIG. 6 illustratively shows various parameters used in the method of FIG. 5 to help explain the method of FIG. 5. As shown in FIG. 5, in step 501, a standard dispersion is calculated as:

$$\sigma = \sqrt{\frac{1}{N}\sum_{i=1}^{N}(D_i - D_l)^2},$$

where N denotes that predetermined N data are taken starting from the data acquired most recently, $D_i$ denotes a value of ith data among the N data, and $D_l$ denotes a value of the data acquired most recently, wherein N representative history data are selected as a basis of the calculation according to user requirements and actual environment.

In step 502, the standard dispersion is adjusted to be $$\sigma = C\sqrt{\frac{1}{N}\sum_{i=1}^{N}(D_i - D_l)^2}$$

according to the user's sensitivity to data (i.e., what the user's accuracy requirements are), where C is a constant in a range of 0-5. That is, for data with high sensitivity (i.e., data that must be very accurate for the user's needs), the standard dispersion σ may be adjusted to be a lower value; for data with low sensitivity (i.e., data that does not need to be as accurate for the needs of the user), the standard dispersion σ may be adjusted to be a larger value. Here, the step 502 is an optional step, that is, the standard dispersion σ may not be adjusted and the process may directly proceed to step 503.

In step 503, a time interval ΔT between the current time and the time at which the data was acquired most recently is calculated, and M data existing in a time period of R*ΔT are counted. Here, R may be any number in a range of 1-100, for example, R may be a decimal (e.g. 3.14), a fraction (e.g. 22/7) or even an irrational number (e.g. π). That is, history data of different ranges are selected according to the time interval ΔT between the current time and the time at which the data was acquired most recently. The longer the time interval is, the more the history data needs to be selected, and there is a directly proportional relationship between them.

In step 504, a number Mi of data whose values are in a range of $D_i \pm \sigma$ among the M history data is counted, and the confidence level is calculated as L=Mi/M.

Next, in step 505, the confidence level is adjusted according to user's requirements. For example, if the time interval between the current time and the time at which the data was most recently acquired exceeds a preset time Tm, the data will be deemed invalid. Therefore, the confidence level is adjusted as:

$$L = \frac{T_m - \Delta T}{T_m} \cdot \frac{M_i}{M}$$

if the time interval ΔT is smaller than Tm, and L=0 if the time interval ΔT is greater than Tm, where Tm is the preset time. Step 505 is also an optional step, that is, the confidence level may not be adjusted and the confidence level calculated in the step 504 may be directly provided.

Figure 7A:
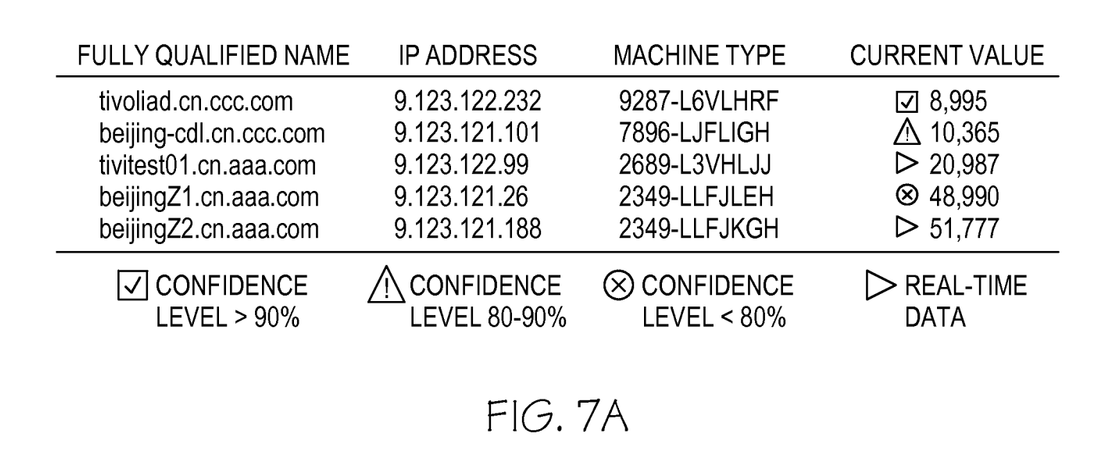
FIGS. 7A and 7B show examples of data integration view that are presented to the user according to the invention.
Figure 7B:
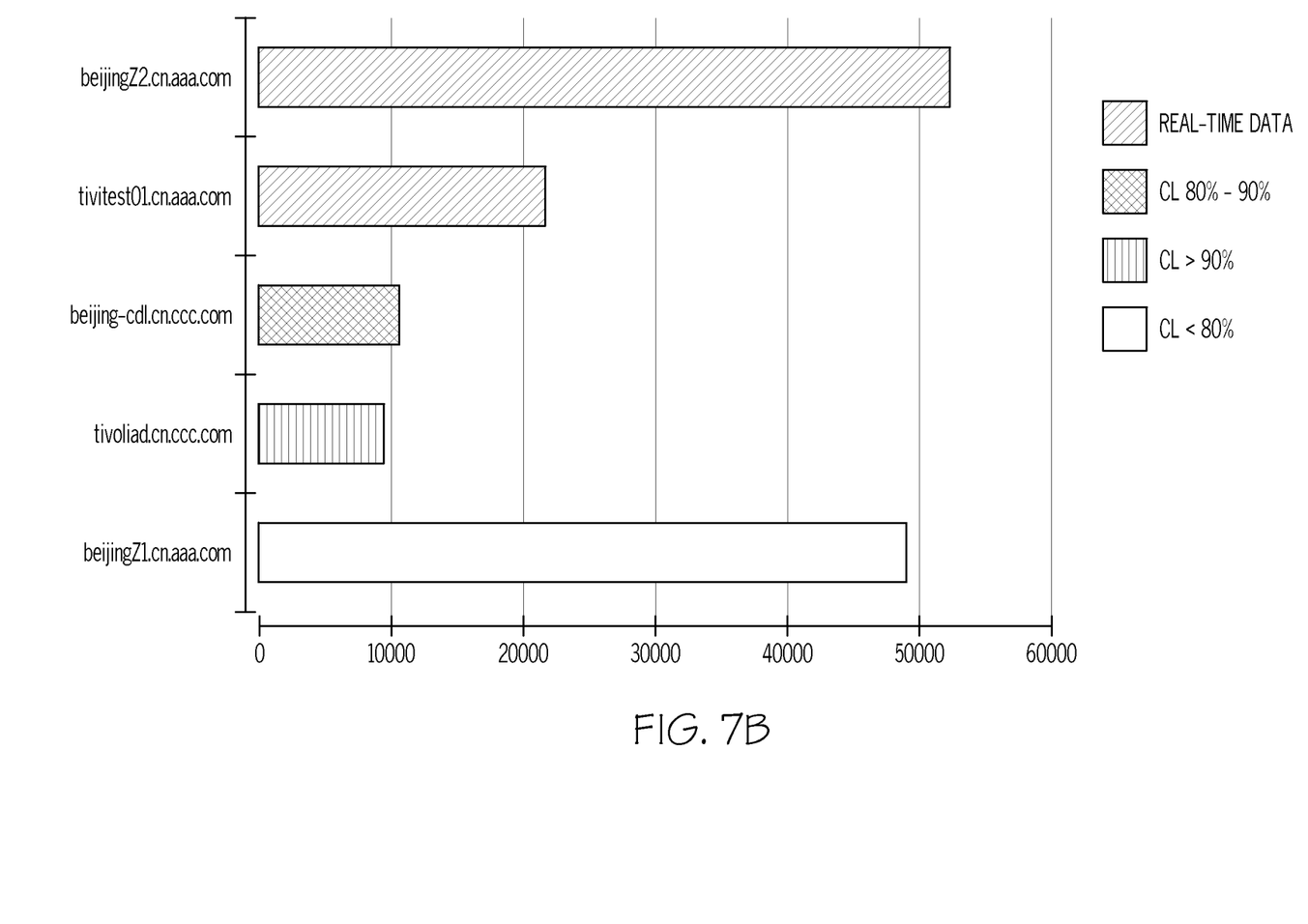

FIGS. 7A and 7B show examples of a data integration view that are presented to the user according to the invention. FIGS. 7A and 7B respectively correspond to FIGS. 1A and 2B, and also show an asset report of current asset values acquired from five different computers. In FIG. 7A, different from FIG. 2A, the three computers that do not have current values in FIG. 2A all have values, and a marker indicative of a confidence level is shown together with the value, for indicating the confidence level of the value. And, a marker is also shown together with the data that can be acquired in real time to indicate that the data is acquired in real time. In FIG. 7B, different from FIG. 2B, the three computers that do not have current values in FIG. 2B all have values, and the confidence levels of the values are shown by different colors or gray scales, such that the user can clearly know which data is the data acquired in real time and which data is the data acquired previously, and also know the confidence level of these data acquired previously, to thereby make appropriate decisions.

FIGS. 7A and 7B are two displayed embodiments of the invention, and various modifications can be made by those skilled in the art to FIGS. 7A and 7B. For example, the calculated value of the confidence level rather than a marker indicative of a numerical range of the confidence level may be directly shown with the data in FIG. 7A. Furthermore, the confidence level may not be displayed, and only different colors are used for distinguishing the data acquired in real time from the data acquired previously.

Furthermore, according to another aspect of the invention, a synchronization period of an updating process for updating the stored data can be optimized according to the confidence level. The updating process may be a data synchronization process for the data consolidation mode in the prior art, or the process for updating the stored data in the invention. Simple rules may be utilized, for example, prolonging the synchronization period for data with high confidence level, to reduce unnecessary system overhead.

Figure 8:
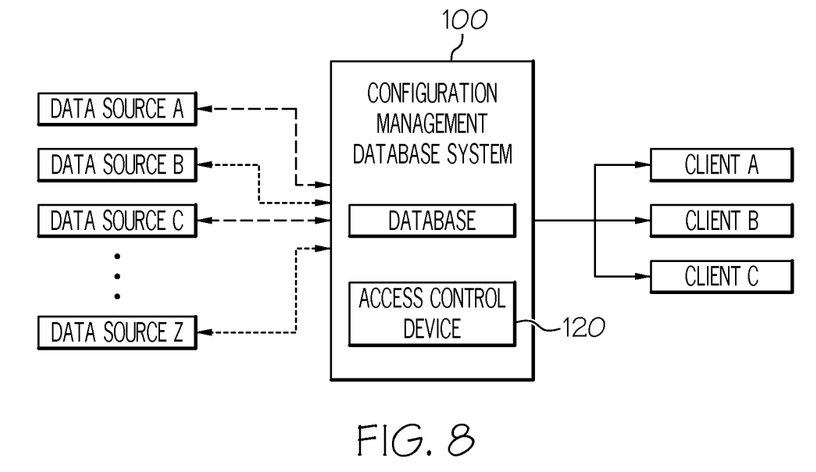
FIG. 8 is a system block diagram showing a configuration management database system according to the invention.

FIG. 8 is a system block diagram showing a configuration management database system according to the invention. As shown in FIG. 8, the configuration management database system 100 is connected to data sources A-Z and clients A-C via network or other connecting manners. The configuration management database system 100 comprises: a database 110 for storing configuration management data; and an access control device 120 for controlling data access operation of the configuration management database system. The configuration management database system 100 receives a data access request from the clients A-C, determines from the data access request whether it is necessary to access the data source to acquire the data in real time; if it is necessary to access the data source to acquire the data in real time, acquires the data from the data source in real time and stores the acquired data; and, if the data cannot be acquired in real time from the data source, acquires the data stored previously and provides the acquired data.

As such, the access control device 120 comprises: means for receiving a data access request (e.g., a communication interface); means for acquiring data in response to the data access request (e.g., a bus to a storage device); means for, for data that is necessary to be acquired in real time by accessing the data source, acquiring the data from the data source in real time and storing the acquired data; means for, if the data cannot be acquired in real time from the data source, acquiring the data stored previously; and means for providing the acquired data (e.g., a processor, a memory, and a display and/or transmission device).

Furthermore, the access control device further comprises: means for, for data that is not necessary to be acquired in real time by accessing the data source, acquiring the data stored previously, wherein the previously-stored data acquired is the data that was previously acquired most recently from the data source.

The configuration management database system 100 of the invention can also provide reliability of data while providing the data to the user. As such, the access control device 120 further comprises: means for calculating a confidence level of the previously-stored data acquired and providing the confidence level while providing the data, wherein the confidence level is provided by a marker indicative of value of the confidence level.

The configuration management database system 100 of the invention further can optimize a synchronization period of the updating process for updating the stored data according to reliability of the data. As such, the access control device 120 further comprises: means for optimizing a synchronization period of the updating process for updating the stored data according to the confidence level.

The time at which the data is acquired is also stored while storing the acquired data and the means for calculating the confidence level of the previously-stored data acquired calculates the confidence level by the method of FIG. 5 according to history records of the stored data.

According to an aspect of the invention, there is provided a data access method for a configuration management database and a configuration management database system which can provide data to the user even if data sources are unavailable.

As such, the data access method for a configuration management database according to the invention comprises: a processor receiving a data access request; for data that is necessary to be acquired in real time by accessing the data source, the processor acquiring the data from the data source in real time and storing the acquired data; if the data cannot be acquired in real time from the data source, the processor acquiring the data stored previously; and the processor providing the acquired data.

The configuration management database system according to the invention comprises: a database for storing configuration management data; and an access control device (e.g., a processor, bus, user interface, communication interface, display, and/or requisite software) for controlling data access operations of the configuration management database system, wherein the access control device comprises: means for receiving a data access request; means for, for data that is necessary to be acquired in real time by accessing the data source, acquiring the data from the data source in real time and storing the acquired data; means for, if the data cannot be acquired in real time from the data source, acquiring the data stored previously; and means for providing the acquired data.

According to another aspect of the invention, there is provided a data access method for a configuration management database and a configuration management database system which can provide reliability of data while also providing the data to the user.

As such, the data access method according to the invention further comprises: calculating a confidence level of the acquired previously-stored data and providing the confidence level while providing the data.

The access control device of the configuration management database system according to the invention further comprises: means for calculating (e.g., a processor and supporting bus, interface, system memory, etc.) a confidence level of the acquired previously-stored data and providing the confidence level while providing the data.

According to a further aspect of the invention, there is provided a data access method for a configuration management database and a configuration management database system which can optimize a synchronization period of an updating process for updating the stored data according to reliability of the data to reduce unnecessary system overhead.

As such, the data access method according to the invention further comprises: optimizing a synchronization period of an updating process for updating the stored data according to the confidence level.

The access control device of the configuration management database system according to the invention further comprises: means for optimizing a synchronization period of an updating process for updating the stored data according to the confidence level.

Thus, it is understood that any reference to "means for" may be implemented in hardware, middleware, and/or supporting software. That is, "means for" may be a processor, which executes instructions in middleware and/or supporting software (e.g., operating systems, application software, etc.) to perform any of the steps, processes, and/or methods described herein.

The invention enhances the existing data federation mode by storing the data that is acquired from the data source in real time, such that data can be provided even if it is necessary to access the data source to acquire the data in real time but the data cannot be acquired. Furthermore, by providing the confidence level of data while providing the data, it may help the user in making decisions, and by optimizing the data acquisition period according to the confidence level, unnecessary system overheads are reduced.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of various embodiments of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described embodiments of the invention of the present application in detail and by reference to illustrative embodiments thereof, it will be apparent that modifications and variations are possible without departing from the scope of the invention defined in the appended claims.

What is claimed is:

1. A computer implemented method for accessing data from a configuration management database, the computer implemented method comprising:

a processor receiving a data access request;

the processor, in response to determining that requested data must be acquired in real time by accessing a data source that initialized the requested data, acquiring the requested data from the data source in real time and storing the requested data as acquired data;

the processor, in response to determining that the requested data cannot be acquired in real time from the data source, acquiring the requested data as previously stored in a configuration management database;

the processor providing the acquired requested data; and the processor calculating a confidence level of acquired and previously-stored data, wherein the acquired and previously-stored data is a copy of the requested data that was most recently acquired from the data source, wherein the confidence level describes a trustworthiness state of the previously-stored data, and wherein calculating the confidence level comprises the processor:

calculating a standard dispersion $$\sigma = \sqrt{\frac{1}{N}\sum_{i=1}^{N}(D_i - D_l)^2},$$

where N denotes that predetermined N data are taken starting from data acquired at a latest time, $D_i$ denotes a value of ith data among the N data, and $D_l$ denotes a value of the data acquired most recently from the data source, calculating a time interval $\Delta T$ between a current time and the latest time at which the data was acquired;

counting M data existing in a time period of $R*\Delta T$ from the latest time at which the data was acquired, where R is any number in a range of 1-100; and counting a number Mi of data whose values exists in a range of $D_l \pm \sigma$ among an M history data, and calculating the confidence level as L=Mi/M.

2. The computer implemented method of claim 1, further comprising:

the processor, in response to determining that the requested data does not need to be acquired in real time by accessing the data source, acquiring the requested data as previously stored.

3. The computer implemented method of claim 1, further comprising:

the processor optimizing a synchronization period of an updating process for updating the previously-stored data according to the confidence level.

4. The computer implemented method of claim 1, further comprising:
the processor determining whether it is necessary to access the data source to acquire the data in real time according to the type of the data requested by the data access request.

5. The computer implemented method of claim 1, wherein the confidence level is provided by a marker indicative of a value of the confidence level.

6. The computer implemented method of claim 1, wherein storing the acquired data further comprises:
the processor storing a time at which the data is acquired; and
the processor calculating the confidence level according to history records of the previously-stored data.

7. The computer implemented method of claim 1, wherein calculating the confidence level further comprises the processor:
adjusting the standard dispersion to be $$\sigma = C\sqrt{\frac{1}{N}\sum_{i=1}^{N}(D_i - D_l)^2}$$

according to a user's sensitivity to data, where C is a constant in a range of 0-5; and
adjusting the confidence level according to a user's requirement as:

$$L = \frac{T_m - \Delta T}{T_m} \cdot \frac{M_i}{M}$$

when the time interval $\Delta T$ is smaller than Tm, and
L=0 when the time interval $\Delta T$ is greater than Tm, where Tm is a preset time.

8. A configuration management database system, comprising:
a database for storing configuration management data; and
an access control device for controlling data access operations of the configuration management database system, wherein the access control device comprises:
a communication interface for receiving a data access request;
a processor:
for data that is necessary to be acquired in real time by accessing the data source, acquiring the data from the data source in real time and storing the acquired data;
for, if the data cannot be acquired in real time from the data source, acquiring data stored previously; and for providing the acquired requested data; and
calculation hardware for calculating a confidence level of acquired and previously-stored data, wherein the acquired and previously-stored data is a copy of the requested data that was most recently acquired from the data source, wherein the confidence level describes a trustworthiness state of the previously-stored data, and wherein calculating the confidence level comprises:
calculating a standard dispersion $$\sigma = \sqrt{\frac{1}{N}\sum_{i=1}^{N}(D_i - D_l)^2},$$

where N denotes that predetermined N data are taken starting from data acquired at a latest time, $D_i$ denotes a value of ith data among the N data, and $D_l$ denotes a value of the data acquired most recently from the data source,
calculating a time interval $\Delta T$ between a current time and the latest time at which the data was acquired;
counting M data existing in a time period of $R*\Delta T$ from the latest time at which the data was acquired, where R is any number in a range of 1-100; and
counting a number Mi of data whose values exist in a range of $D_i \pm \sigma$ among an M history data, and calculating the confidence level as L=Mi/M.

9. The configuration management database system according to claim 8, wherein the access control device further comprises:
acquisition hardware for, for data that is not necessary to be acquired in real time by accessing the data source, acquiring the data stored previously.

10. The configuration management database system according to claim 8, wherein the access control device further comprises:
optimization hardware for optimizing a synchronization period of an updating process for updating the previously-stored data according to the confidence level.

11. The configuration management database system according to claim 8, wherein it is determined whether it is necessary to access the data source to acquire the data in real time according to the type of the data requested by the data access request.

12. The configuration management database system according to claim 8, wherein storing the acquired data further comprises storing a time at which the data is acquired, and wherein the calculation hardware, for calculating the confidence level of the data stored previously, calculates the confidence level according to history records of the previously-stored data.

13. The configuration management database system according to claim 8, wherein calculating the confidence level further comprises:
adjusting the standard dispersion to be $$\sigma = C\sqrt{\frac{1}{N}\sum_{i=1}^{N}(D_i - D_l)^2}$$

according to a user's sensitivity to data, where C is a constant in a range of 0-5; and
adjusting the confidence level according to a user's requirement as:

$$L = \frac{T_m - \Delta T}{T_m} \cdot \frac{M_i}{M}$$

when the time interval $\Delta T$ is smaller than Tm, and
L=0 when the time interval $\Delta T$ is greater than Tm, where Tm is a preset time.

14. A computer program product for accessing data, the computer program product comprising:

a non-transitory computer readable storage media;
first program instructions to receive a data access request;
second program instructions to, in response to determining that requested data must be acquired in real time by accessing a data source that created the requested data, acquire the requested data from the data source in real time and store the acquired data;
third program instructions to, in response to determining that the requested data cannot be acquired in real time from the data source, acquire the requested data that was previously stored in a configuration management database;
fourth program instructions to provide the acquired requested data; and
fifth program instructions to calculate a confidence level of acquired and previously-stored data, wherein the acquired and previously-stored data is a copy of the requested data that was most recently acquired from the data source, wherein the confidence level describes a trustworthiness state of the previously-stored data, and wherein calculating the confidence level comprises:
calculating a standard dispersion $$\sigma = \sqrt{\frac{1}{N}\sum_{i=1}^{N}(D_i - D_l)^2},$$

where N denotes that predetermined N data are taken starting from data acquired at a latest time, $D_i$ denotes a value of ith data among the N data, and $D_l$ denotes a value of the data acquired most recently from the data source,
calculating a time interval $\Delta T$ between a current time and the latest time at which the data was acquired;
counting M data existing in a time period of $R*\Delta T$ from the latest time at which the data was acquired, where R is any number in a range of 1-100; and
counting a number Mi of data whose values exists in a range of $D_l \pm \sigma$ among an M history data, and calculating the confidence level as L=Mi/M;
and wherein the first, second, third, fourth, and fifth program instructions are stored on the non-transitory computer readable storage media.

* * * * *